(12) United States Patent
Nishino et al.

(10) Patent No.: US 8,138,747 B2
(45) Date of Patent: Mar. 20, 2012

(54) EVALUATION METHOD FOR EVALUATING BATTERY SAFETY IN THE EVENT OF INTERNAL SHORT CIRCUIT AND EVALUATION APPARATUS USED THEREFOR

(75) Inventors: Hajime Nishino, Nara (JP); Kenichi Suzuki, Osaka (JP); Shinji Kasamatsu, Osaka (JP); Masato Fujikawa, Osaka (JP); Mikinari Shimada, Osaka (JP)

(73) Assignee: Panasonic Corporation, Osaka (JP)

( * ) Notice: Subject to any disclaimer, the term of this patent is extended or adjusted under 35 U.S.C. 154(b) by 1079 days.

(21) Appl. No.: 12/027,111

(22) Filed: Feb. 6, 2008

(65) Prior Publication Data

US 2008/0186029 A1 Aug. 7, 2008

(30) Foreign Application Priority Data

Feb. 6, 2007 (JP) .................................. 2007-026744

(51) Int. Cl.
*G01N 27/416* (2006.01)
(52) U.S. Cl. .......... 324/134; 324/426; 320/132; 429/61; 429/62; 429/452; 429/453
(58) Field of Classification Search .................. 320/132; 324/426, 434; 429/61, 62, 452, 453
See application file for complete search history.

(56) References Cited

U.S. PATENT DOCUMENTS 6,054,233 A * 4/2000 Vourlis ............................ 429/61
2005/0253591 A1* 11/2005 Kasamatsu et al. ........... 324/432

FOREIGN PATENT DOCUMENTS

| JP | 11-102729 | 4/1999 |
| JP | 2006-313739 | 11/2006 |
| KR | 2005113988 A * | 12/2005 |

* cited by examiner

*Primary Examiner* — Samuel Berhanu
(74) *Attorney, Agent, or Firm* — McDermott Will & Emery LLP

(57) ABSTRACT

The present invention relates to an internal short circuit evaluation method for a battery including an electrode group including a positive electrode plate, a negative electrode plate and a separator disposed between the positive electrode plate and the negative electrode plate, and an outer jacket covering the electrode group, the method including the steps of: (I) processing the electrode group to a predetermined position of the electrode group, from the outside of the electrode group toward the inside thereof; and (II) causing a short circuit between a portion of the electrode plate and a portion of the negative electrode plate of the electrode group that are located inside from the predetermined position, and measuring battery information that is changed by the short circuit, and an evaluation apparatus used for the above-described method.

17 Claims, 2 Drawing Sheets

EVALUATION METHOD FOR EVALUATING BATTERY SAFETY IN THE EVENT OF INTERNAL SHORT CIRCUIT AND EVALUATION APPARATUS USED THEREFOR

BACKGROUND OF THE INVENTION

The present invention relates mainly to an evaluation method and an evaluation apparatus for batteries, and particularly to a method for evaluating safety in the event of an internal short circuit caused, for example, by entrance of foreign matter or breakage of the separator, and an apparatus used for the aforementioned evaluation.

The battery evaluation tests for evaluating the thermal behavior in the event of an internal short circuit as a safety item of batteries such as lithium ion secondary batteries include, for example, the UL standard (UL 1642) for lithium batteries and a guideline (SBA G1101-1997 Guideline for Safety Evaluation on Secondary Lithium Cells) from The Battery Association of Japan. Such evaluation tests are utilized and the results of the tests are reflected in the development of various batteries. For example, in Laid-Open Patent Publication No. Hei 11-102729 (Document 1), the battery manufacturing process has been improved in order to obtain a high-capacity battery exhibiting excellent high-output characteristics and cycle characteristics and having a high level of safety. In Laid-Open Patent Publication No. 2006-313739 (Document 2), it is proposed to set a predetermined range for the ratio between the thickness of the heat-resistant porous layer disposed between the positive electrode and the negative electrode and the thickness of the side wall of the battery can, in order to achieve both a high level of safety and high battery characteristics in a lithium secondary battery.

The above-described evaluation tests include, for example, the nail penetration test, which is a test for examining an internal short circuit caused by a nail penetrated through or pierced into a battery from the side. By piercing the nail, a short circuit portion is caused by the nail between the positive electrode and the negative electrode inside the battery. Consequently, a short circuit current flows through a short circuit portion, thus generating Joule heat. A change in the battery temperature or the battery voltage that is caused by these phenomena is measured in the internal short circuit test.

The crush test is a test for examining an internal short circuit caused by physically deforming a battery using a round bar, a square bar, a flat plate or the like. More specifically, in the crush test, an internal short circuit is caused between the positive electrode and the negative electrode by physical deformation, and a change in the battery temperature or the battery voltage is measured.

However, with these conventional battery evaluation methods, it is not possible to accurately evaluate safety against an internal short circuit that may be caused in the inner part of the battery on the market, especially by entrance of conductive fine foreign matter.

More specifically, the battery safety in the event of an internal short circuit is greatly influenced by the amount of Joule heat generated at the short circuit portion. When V (V) represents the battery voltage, R1 ($\Omega$) represents the resistance at the short circuit portion and R2 ($\Omega$) represents the internal resistance of the battery, the amount of heat W (W) generated at the short circuit portion is expressed by the following equation:

$$W = V^2 \times R1/(R1+R2)^2$$

The above-described equation indicates that the amount of heat generation changes according to the resistance R1 of the short circuit portion. That is, it can be understood that the battery safety also changes according to the resistance at the short circuit portion.

For example, in the case where the electrode plate is formed by a current collector and a material mixture carried on the current collector, it is known that a portion on which the material mixture is applied, a portion on which metal foil is exposed, and so on are present on the electrode plate, and the resistance value varies with the locations of the short circuit. In other words, it can be understood that the battery safety in the event of an internal short circuit varies with the portions at which an internal short circuit has occurred.

In the conventional nail penetration test, a short circuit starts to occur from the outermost part of the battery. For this reason, in the case where a low resistant area, specifically, a current collector-exposed portion or the like in which there is no active material is provided at the outermost part of the battery, the results of the evaluation is greatly influenced by the short circuit resistance at the outermost part, so that the battery is evaluated to be safe.

However, in case conductive foreign matter has entered into the battery, there is a possibility that an internal short circuit may occur at any given location inside the battery, depending, for example, on the size, shape or hardness of the foreign matter, thus causing an internal short circuit at an electrical resistance different from that of the nail penetration test.

That is, the conventional nail penetration test can evaluate only a part of the safety against an internal short circuit that may occur on the market.

With regard to the conventional crush test, it has been found by analysis of the short circuit behavior during the crush test that plural points are simultaneously short-circuited at once in the battery. That is, the crush test also cannot accurately evaluate the safety against an internal short circuit that may be caused on the market, especially by entrance of foreign matter and the like.

Further, in considering the purpose of use of batteries, it is necessary to know the level of safety performance of each battery, such as "There is no heat generation" or "There is some heat generation", in the event of an internal short circuit. However, with the conventional evaluation methods, the safety against an internal short circuit cannot be evaluated accurately, and therefore, the level of safety of batteries also cannot be determined.

For the above-described reasons, there is a strong demand for an evaluation method and an evaluation apparatus for evaluating the overall safety of batteries against an internal short circuit by performing a short circuit test at a given location in a battery, and for determining the safety level of batteries.

BRIEF SUMMARY OF THE INVENTION

The present invention relates to an internal short circuit evaluation method for a battery including an electrode group including a positive electrode plate, a negative electrode plate and a separator disposed between the positive electrode plate and the negative electrode plate, and an outer jacket covering the electrode group, the method including the steps of: (I) processing the electrode group to a predetermined position of the electrode group, from the outside of the electrode group toward the inside thereof; and (II) causing a short circuit between a portion of the positive electrode plate and a portion of the negative electrode plate of the electrode group that are located inside from the predetermined position, and measuring battery information that is changed by the short circuit. It is preferable that, in the step (I), the processing is performed without causing a continuous short circuit.

In a preferable embodiment of the present invention, the step (I) includes a step of forming, in the electrode group, a notch extending to the predetermined position of the electrode group, from the outside of the electrode group toward the insider thereof.

In another preferable embodiment of the present invention, the step (I) includes a step of removing a portion of the electrode group to the predetermined position of the electrode group, from the outside of the electrode group toward the inside thereof.

In yet another embodiment of the present invention, the step (I) includes a step of forming, in the electrode group, a through hole extending to the predetermined position of the electrode group, from the outside of the electrode group toward the inside thereof.

It is preferable that the step (I) is performed after removing the electrode group from the outer jacket.

In the step (I), the processing may be performed using a processing member, and the processing member may be vibrated or rotated. Alternatively, the processing member may be vibrated and rotated.

It is preferable that the processing member has a tip portion having a shape of a sharp projection, a shape of a sharp blade edge, or a grindstone-like surface.

It is preferable that, in the step (II), the short circuit is caused by pushing or piercing a pressurizing member into the predetermined position, and the pressurizing member has a tip portion having a shape of a sharp projection or a shape of a sharp blade edge.

The present invention also relates to an internal short circuit evaluation apparatus for a battery including an electrode group including a positive electrode plate, a negative electrode plate and a separator disposed between the positive electrode plate and the negative electrode plate, and an outer jacket covering the electrode group, the apparatus including: (1) a processing portion including a processing member for processing the electrode group to a predetermined position of the electrode group, from the outside of the electrode group toward the inside thereof; (2) a pressurizing portion including a pressurizing member for pressurizing a portion of the positive electrode plate and a portion of the negative electrode plate of the electrode group that are located inside from the predetermined position, thereby short-circuiting the battery; (3) a battery information measurement portion for measuring battery information that is changed when the battery is short-circuited; (4) a short circuit detection portion for detecting a change of the battery information that is measured by the battery information measurement portion, and determining occurrence of an internal short circuit by comparing the battery information with a predetermined reference value; and (5) a pressurization control portion for controlling the pressurizing portion according to a signal from the short circuit detection portion. It is preferable that the processing member and the pressurizing member are the same.

The evaluation apparatus may further include a vibration generation portion for vibrating the processing member, or may include a rotation mechanism for rotating the processing member. Alternatively, the evaluation apparatus may include both the vibration generation portion and the rotation mechanism.

It is preferable that the processing member has a tip portion having a shape of a sharp projection, a shape of a sharp blade edge, or a grindstone-like surface. It is preferable that the pressurizing member has a tip portion having a shape of a sharp projection or a shape of a sharp blade edge.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

In the following, the present invention will be described in detail.

As described above, it is known that the level of safety varies at predetermined locations inside a battery. Therefore, the present invention provides an internal short circuit evaluation method capable of causing a short circuit at a given point of a battery including an electrode group including a positive electrode plate, a negative electrode plate and a separator disposed between the positive electrode plate and the negative electrode plate, and an outer jacket covering the electrode group. More specifically, the internal short circuit evaluation method according to the present invention includes the steps of: (I) processing the electrode group to a predetermined position of the electrode group, from the outside of the electrode group toward the inside thereof; and (II) causing a short circuit between a portion of the electrode plate and a portion of the negative electrode plate of the electrode group that are located inside from the predetermined position, and measuring battery information that is changed by the short circuit.

The above-described evaluation method can be performed, for example, using an evaluation apparatus including:

(1) a processing portion including a processing member for processing the electrode group to a predetermined position of the electrode group, from the outside of the electrode group toward the inside thereof;

(2) a pressurizing portion including a pressurizing member for pressurizing a portion of the positive electrode plate and a portion of the negative electrode plate of the electrode group that are located inside from the predetermined position, thereby short-circuiting the battery;

(3) a battery information measurement portion for measuring battery information that is changed when the battery is short-circuited;

(4) a short circuit detection portion for detecting a change of the battery information that is measured by the battery information measurement portion, and determining occurrence of an internal short circuit by comparing the battery information with a predetermined reference value; and (5) a pressurization control portion for controlling the pressurizing portion according to a signal from the short circuit detection portion.

Figure 1:
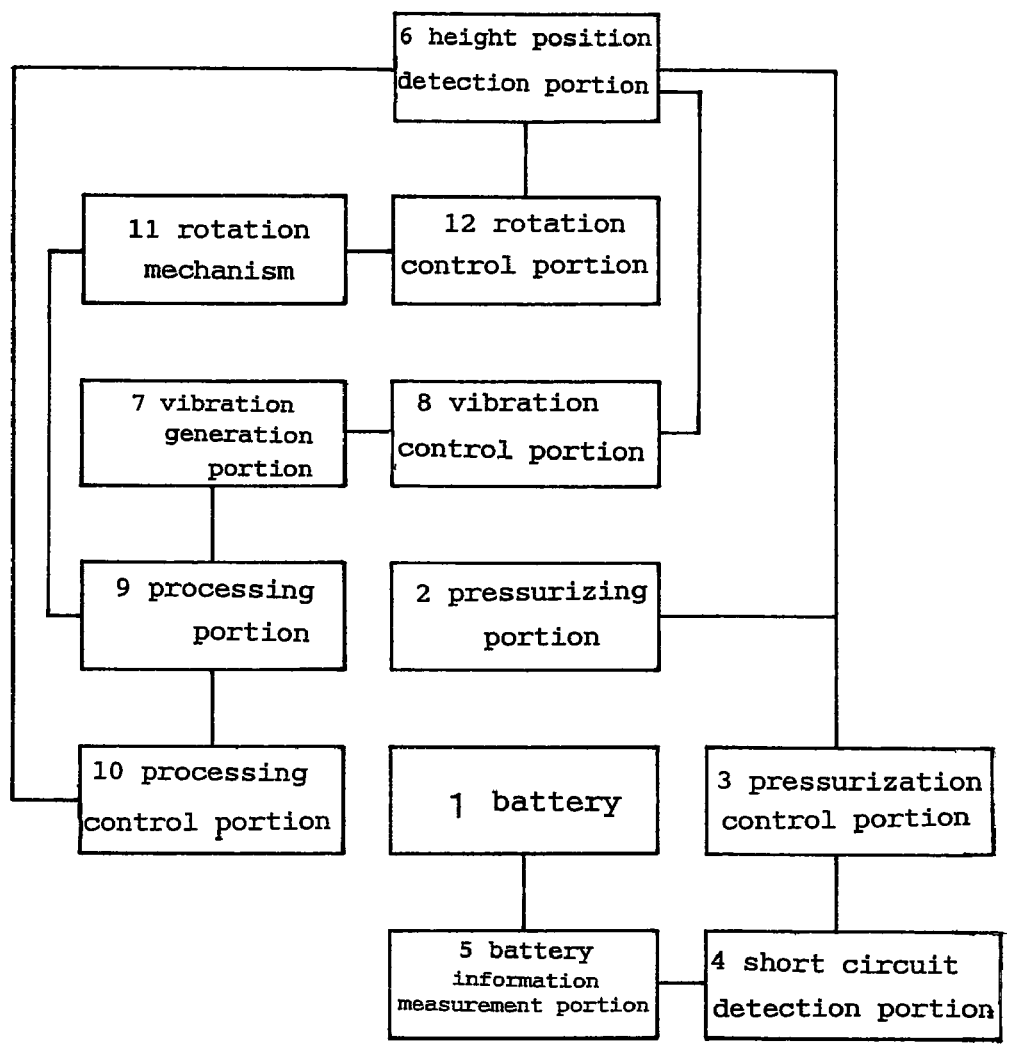
FIG. 1 is a block diagram showing an internal short circuit evaluation apparatus for a battery according to an embodiment of the present invention.

FIG. 1 shows a block diagram of an evaluation apparatus according to an embodiment of the present invention. The evaluation apparatus shown in FIG. 1 includes: a processing portion 9 for processing a battery 1; a processing control portion 10 for controlling the processing portion 9; a pressurizing portion 2 for pressurizing the battery 1; a pressurization control portion 3 for controlling the pressurizing portion 2; a battery information measurement portion 5 for measuring the battery information of the battery 1; a short circuit detection portion 4 for detecting a short circuit in the battery 1 that has been pressurized with the pressurizing portion 2; and a height position detection portion 6 for detecting the height (travel distance) of the processing portion 9 or the pressurizing portion 2.

In the evaluation apparatus shown in FIG. 1, first, according to a signal from the height position detection portion 6, the electrode group of the battery 1 is processed to a predetermined position of the electrode group using the processing portion 9, from the outside of the electrode group toward the inside thereof. The processing portion 9 is controlled by the processing control portion 10.

As described above, the conventional nail penetration test has been performed without removing portions of the electrode plates of the electrode group that are located outside from a given position in the battery and the outer jacket. Consequently, the test results are greatly influenced by short circuits occurred in the portions of the electrode plates of the electrode group that are located outside the aforementioned position and the outer jacket, so that it is not possible to accurately achieve the short circuit occurred at that position. Therefore, according to the present invention, a given position of the electrode group is electrically insulated from a portion of the electrode group that is located outside the aforementioned position by cutting portions of the electrode plates of the electrode group that are located outside from that position and the outer jacket, thereby causing a short circuit at that position. Alternatively, it is possible to remove a portion of the outer jacket of the battery and portions of the electrode plates of the electrode group or to form a hole to a given position of the electrode group, without causing a continuous short circuit.

More specifically, this processing step may be a step of forming a notch extending to a predetermined position of the electrode group, from the outside of the electrode group toward the inside thereof. There is no particular limitation with respect to the length of the notch provided in the electrode group, as long as the notch is provided on a predetermined position of the electrode group. For example, portions of the positive electrode plate, the negative electrode plate and the separator of the electrode group that are located outside from a predetermined position may be completely cut away, from one end in the height direction of the electrode group toward the other end thereof. Alternatively, a notch having a predetermined length may be formed on a predetermined position of the electrode group. For example, the notch may have a V-shaped cross section in a direction perpendicular to the longitudinal direction thereof. Alternatively, the notch may be formed in the electrode group such that the region surrounded by the notch is positioned on a predetermined position of the electrode group. In this way, the electrode portions located outside from a predetermined position of the electrode group can be insulated from other portions.

Alternatively, the processing step may be a step of removing a portion of the electrode group to the predetermined position of the electrode group, from the outside of the electrode group toward the inside thereof.

Alternatively, the processing step may be a step of forming, in the electrode group, a through hole extending to the predetermined position of the electrode group, from the outside of the electrode group toward the inside thereof.

Such processing can be performed using the processing portion 9 including a processing member (not shown) capable of processing the electrode group.

In the step of processing the electrode group, it is important to prevent a continuous short circuit from occurring at portions other than a predetermined position of the electrode group so that only the predetermined position can be short-circuited. In other words, even if a short circuit occurred in the portions other than the predetermined position at the time of processing the electrode group, it is necessary that the short circuit occurred at those portions be a momentary short circuit so that the battery temperature will not increase. For example, the above-described continuous short circuit can be inhibited by processing the electrode group, while vibrating or rotating, or while rotating and vibrating the processing portion 9, more specifically, the processing member. Although, a short circuit occurs between the positive electrode and the negative electrode at the time of cutting the electrode plates, for example, the positive electrode plate and the negative electrode plate can be only momentarily short-circuited by vibrating the processing portion 9 at a very high frequency (e.g., not less than 10 kHz). In other words, it is possible to prevent the short circuit from occurring continuously. As such, it is possible to reliably reduce the possibility of occurrence of a continuous short circuit during processing of the electrode group, by cutting the electrode plate while applying fast vibrations and/or rotations to the processing member. Furthermore, by vibrating the processing member, it is possible to suppress creation of burrs on a cut surface, or breakage of a cut surface, thereby performing accurate processing. Further, by rotating the processing member, it is possible to suppress creation of burrs or inwardly bent portions on a cut surface and/or a drilled surface, thereby performing accurate processing.

The evaluation apparatus shown in FIG. 1 includes a vibration generation portion 7 for vibrating the processing portion 9, and a rotation mechanism 11 for rotating the processing portion 9. For example, an ultrasonic generator can be used as the vibration generation portion 7. In the case of using an ultrasonic generator as the vibration generation portion 7, the processing portion 9 is vibrated by applying ultrasonic waves to the processing portion 9. Examples of the rotation mechanism 11 include a motor.

In the evaluation apparatus shown in FIG. 1, the processing portion 9 moves in the depth direction of the electrode group (i.e., from the outside of the electrode group toward the inside thereof), while processing the electrode group. When the processing portion 9 has reached a predetermined position of the electrode group, the processing control portion 10 stops the movement of the processing portion 9 according to a signal from the height position detection portion 6.

During the processing of the electrode group using the processing portion 9, the vibration generation portion 7 applies vibrations to the processing member, and the rotation mechanism 11 rotates the processing member. Application of vibrations to the processing member is controlled by a vibration control portion 8. When the processing member has reached a predetermined position of the electrode group, the vibration control portion 8 stops the application of vibrations to the processing member according to a signal from the height position detection portion 6. Similarly, the rotation of the processing member is controlled by a rotation control portion 12. When the processing member has reached a predetermined position of the electrode group, the rotation control portion 12 stops the rotation of the processing member according to a signal from the height position detection portion 6.

The evaluation apparatus of the present invention may only include the rotation mechanism and the rotation control portion, or may only include the vibration generation portion and the vibration control portion.

The above-described various control portions may include, for example, a receiving portion for receiving a command from another component, and a transmitting portion capable of transmitting an additional command according to the above-mentioned command.

Further, in order to prevent occurrence of a continuous short circuit at portions other than the above-described predetermined position at the time of processing the electrode group, it is preferable that the processing member has a tip portion having a shape of a sharp projection or a shape of a sharp blade edge. By using a processing member having a tip portion having the above-described shapes, it is possible to process the electrode group without applying pressure to the short circuit point. When an excessive pressure is applied to a processing point (e.g., a cutting point), there will be no space for separating the positive electrode plate and the negative electrode plate from each other, for example, even in the case where the processing portion is being vibrated, so that it may be difficult to eliminate the short circuit. Further, a processing member having a grindstone-like surface may be used. By using such a processing portion, it is possible to cut away the outer jacket and the electrode plates of the battery without application of pressure. Accordingly, by using a processing portion as described above, it is possible to reliably reduce the possibility of occurrence of a continuous short circuit at the time of processing the electrode group. Furthermore, by using a processing member having a tip portion having the above-described shapes, it is possible to suppress creation of burrs on a cut surface or breakage of a cut surface, thereby performing accurate processing.

As the material of the processing member, it is possible to use, for example, metals such as iron, nickel and stainless steel, and nonconductors such as ceramic, resin and diamond. Further, it is also possible to use a processing member formed by covering the surface of a predetermined material (e.g., any of the above-described metals) with any of the above-described nonconductors. By using any of above-described metals as a constituent material of the processing member, it is possible to increase the life of the processing member. By forming the processing member from any of the above-described nonconductors or including any of the above-described nonconductors in the surface portion of the processing portion, it is possible to reliably reduce the possibility of occurrence of a continuous short circuit at the time of processing the electrode group.

As the processing member, it is possible to use, for example, a processing member including a cutter, a nail or the like attached on its tip. For example, in the case of using a processing member including a cutter attached on its tip, the electrode group can be processed by cutting the electrode group with the cutter.

The above-described steps of forming a notch in the electrode group and removing a part of the electrode group can be performed using, for example, a processing member including a cutter attached on its tip. The step of forming a through hole in the electrode group can be performed using, for example, a processing member including a nail attached on its tip or a processing member having a grindstone-like surface.

Next, after processing the electrode group to a predetermined position thereof using the processing portion 9, the pressurizing portion 2 pressurizes a positive electrode portion and a negative electrode portion of the electrode group that are located inside from the predetermined position according to a signal from the height position detection portion 6, thereby causing a short circuit. The pressurizing portion 2 is controlled by the pressurization control portion 3 according to a signal from the processing control portion 10. The pressurizing portion 2 may include a pressurizing member.

It is preferable that the pressurizing member included in the pressurizing portion 2 has a tip portion having a shape of a sharp projection or a shape of a sharp blade edge. By pushing or piercing such a pressurizing member into the electrode portions located inside from the predetermined position of the electrode group, it is possible to reliably cause a short circuit between portions of the positive electrode plate and the negative electrode plate that are located in the vicinity of the tip of the pressurizing member. At this time, the short circuit may be caused by a direct contact between the positive electrode plate and the negative electrode plate. Alternatively, the positive electrode plate and the negative electrode plate may be short-circuited via the pressurizing member.

As the material of the pressurizing member, it is possible to use, for example, metals such as iron, nickel and stainless steel, nonconductors such as insulating ceramic and resin, and high-resistance materials such as semiconductors and resins containing a conductive agent. Further, it is possible to use a pressurizing member formed by coating a predetermined material (e.g., any of the above-described metals and nonconductors) with any of the above-described high-resistance materials. In the case where the material of the pressurizing member is metal, it is possible to increase the life of the pressurizing member. By using a processing portion composed of a high-resistance material or a processing member whose surface includes a high-resistance material, it is possible to control the resistance at the short circuit point.

With regard to the conditions for pressurization using the pressurizing portion 2, the pressurization rate is preferably 0.1 mm/s to 180 mm/s, and the applied pressure is preferably not more than 50 kg. By performing the pressurization under such pressurization conditions, it is possible to effectively cause a short circuit at a predetermined position inside the battery.

The pressurizing portion 2 preferably includes a pressurization apparatus (not shown). By using the pressurization apparatus, the pressurizing member can pressurize the electrode portions of the electrode group that are located inside from the predetermined position. Examples of the pressurization apparatus include a screw type using a servomotor, a post guide screw type, a pendulum type, a lever type, a crank type, a mechanical press type, a hydraulic press type and an air press type.

In the evaluation apparatus shown in FIG. 1, when causing a short circuit at a predetermined position of the electrode group using the pressurizing portion 2, the battery information of the battery 1 including that electrode group is measured with the battery information measurement portion 5. The short circuit detection portion 4 receives the battery information measured with the battery information measurement portion 5. When the battery information measured with the battery information measurement portion 5 has changed, it is determined in the short circuit detection portion 4 whether or not a short circuit has occurred by comparing the changed battery information with a predetermined reference value. If it is determined that a short circuit has occurred, then a signal is transmitted from the short circuit detection portion 4 to the pressurization control portion 3, and the pressurization using the pressurizing portion 2 is stopped, whereupon the evaluation is completed.

As the short circuit detection portion 4, it is possible to use, for example, a predetermined circuit capable of detecting a change in the battery information of the battery 1, determining occurrence of an internal short circuit by comparing the changed battery information with a predetermined reference value, and transmitting a signal to the pressurization control portion if it is determined that an internal short circuit has occurred.

Examples of the battery information measured with the battery information measurement portion 5 include the battery voltage, the battery temperature and the internal pressure. Among them, the battery voltage is sensitively dependent on an internal short circuit, and therefore, it is preferable to measure the battery voltage as the battery information. More specifically, when pushing the pressurizing portion into the electrode group in order to cause a short circuit, it is preferable that the battery voltage is measured in advance, and the pressurization with the pressurizing portion is stopped when there has been a battery voltage drop caused by an internal short circuit. This makes it possible to locally cause an internal short circuit at a predetermined position of the electrode group. If the short circuit area varies with measurements, then the amount of heat generation may vary, decreasing the accuracy of the evaluation of safety against an internal short circuit. Additionally, in the case of measuring the battery voltage as the battery information, it is possible to use, for example, a voltmeter as the battery information measurement portion.

In the case of measuring the battery temperature as the battery information, it is possible to use, for example, a thermocouple or a thermoviewer as the battery information measurement portion. Alternatively, the amount of heat generated by the short circuit may be measured as the battery information. In this case, it is possible to use, for example, a calorimeter as the battery information measurement portion.

In the case where the battery information is the internal pressure of the battery, it is possible to use any apparatus capable of measuring the pressure inside the battery as the battery information measurement portion without any particular limitation.

In the present invention, it is preferable to use a battery that has been charged to a predetermined voltage so that the above-described battery information can be obtained. The end-of-charge voltage may be appropriately selected in accordance with, for example, the type of the battery.

The above-described reference value provided in the short circuit detection portion 4 may be appropriately selected in accordance with the level of safety required for the battery.

The signal transmitted from the short circuit detection portion 4 to the pressurization control portion 3 when it is determined that an internal short circuit has occurred may be transmitted upon the determination of occurrence of the internal short circuit. The signal may be transmitted after a predetermined delay using a timer or the like. Alternatively, after the determination of occurrence of the short circuit, the pressurization control portion 3 may receive the positional information of the pressurizing portion 2 from the height position detection portion 6, and the pressurization control portion 3 may stop the pressurizing portion 2 after the pressurizing portion 2 has reached a predetermined depth.

In the evaluation apparatus of the present invention, the processing portion 9 may be used as the pressurizing portion 2. In other words, the processing member may be used as the pressurizing member. More specifically, after completion of the processing using the processing portion, the vibration and/or rotation of the processing portion is stopped, and the processing portion is used in this state as the pressurizing portion, without moving the processing portion. Thus, a short circuit can be caused at a predetermined position of the electrode group. In the case where the processing member and the pressurizing member are different jigs in the evaluation apparatus, the battery 1 may be moved from the processing portion 9 to the pressurizing portion 2, or the processing portion 9 and the pressurizing portion 2 may be moved while the location of the battery 1 is fixed.

In the present invention, it is preferable that the electrode group is taken out of the outer jacket, and the removed electrode group is subjected to the above-described evaluation method. In other words, it is preferable that the evaluation method of the present invention includes a step of taking the electrode group out of the outer jacket before processing the battery. This makes it possible to accurately cause an internal short circuit at a desired location of the electrode group. Furthermore, it becomes possible to reliably reduce the possibility of occurrence of a continuous short circuit at portions other than a predetermined position of the electrode group in the step of processing the electrode group.

As described above, with the use of the evaluation method and evaluation apparatus of the present invention, it is possible to cause a short circuit at any given positions (i.e., positions with different levels of safety) inside the battery. Accordingly, it is possible to accurately evaluate the battery safety against various internal short circuits that may occur on the market for any configuration of batteries.

Furthermore, with the present invention, it is possible to determine the safety level of a battery, thereby facilitating, for example, the selection of the optimum use for that battery and the designing of the application device using that battery.

There is no particular limitation with respect to the types of batteries that can be evaluated using the evaluation method and evaluation apparatus of the present invention. The present invention can be used for evaluating primary batteries such as manganese dry batteries, alkaline dry batteries and lithium primary batteries, and secondary batteries such as lead-acid batteries, nickel-cadmium storage batteries, nickel-metal hydride batteries and lithium secondary batteries. The electrode group included in the battery may be a laminated type or a wound type.

The method for manufacturing a battery whose safety level has been determined with the evaluation method of the present invention may be used to manufacture a battery or a battery pack having the aforementioned safety level. More specifically, a battery is manufactured using a predetermined manufacturing method, and the obtained battery is evaluated using the evaluation method of the present invention. If this battery is determined to have a desired safety level, then the manufacturing method used for the battery can be used to manufacture a battery having the desired safety level or a battery pack including such battery.

As described above, by using the same manufacturing method as that used for a battery whose safety level has been determined, it is possible to ensure the safety level of a battery or a battery pack against an internal short circuit.

EXAMPLES

In the following, the present invention will be described more specifically by way of examples.

<Fabrication of Battery>

A cylindrical lithium secondary battery as described below was fabricated as a battery for evaluating safety against an internal short circuit.

(i) Production of Positive Electrode 3 kg of nickel/manganese/cobalt/lithium oxide ($LiN_{1/3}Mn_{1/3}Co_{1/3}O_2$) powder having a median diameter of 15 μm as a positive electrode active material, 1 kg of an N-methyl-2-pyrrolidone (NMP) solution (#1320 (trade name) manufactured by Kureha Corporation) containing 12 wt % of polyvinylidene fluoride (PVDF) as a binder, 90 g of acetylene black as a conductive agent and a proper amount of NMP as a dispersion medium were stirred using a double arm kneader to prepare a positive electrode material mixture paste. The obtained positive electrode material mixture paste was applied onto both sides of a band-shaped positive electrode current collector made of aluminum foil having a thickness of 20 μm. The applied positive electrode material mixture paste was dried, and the dried positive electrode material mixture was rolled using a roll so that the thickness was reduced to 180 μm, thereby forming a positive electrode active material layer. The resulting electrode plate was cut to a width (56 mm) that could be inserted into a cylindrical battery case having a diameter of 18 mm, a height of 65 mm and an internal diameter of 17.85 mm, thereby obtaining a positive electrode.

A portion of the obtained positive electrode that was located at the innermost part of the electrode group was provided with a positive electrode current collector-exposed portion, and a lead made of aluminum was welded to that exposed portion. A positive electrode current collector-exposed portion having a length corresponding to about one turn of the electrode group was provided in a portion of the positive electrode that was located at the outermost part of the electrode group.

(ii) Production of Negative Electrode
(a) Negative Electrode Plate A 3 kg of artificial graphite powder having a median diameter of 20 μm as a negative electrode active material, 75 g of an aqueous dispersion (BM-400B (trade name) manufactured by ZEON Corporation) containing 40 wt % of modified styrene butadiene rubber particles as a binder, 30 g of carboxymethyl cellulose (CMC) as a thickener and a proper amount of water as a dispersion medium were stirred using a double arm kneader to prepare a negative electrode material mixture paste. The obtained negative electrode material mixture paste was applied onto both sides of a band-shaped negative electrode current collector made of copper foil having a thickness of 20 μm. The applied negative electrode material mixture paste was dried, and the dried negative electrode material mixture was rolled using a roll so that the thickness was reduced to 180 μm, thereby forming a negative electrode active material layer. The resulting electrode plate was cut to a width (57.5 mm) that could be inserted into the battery case, thereby obtaining a negative electrode.

A portion of the obtained negative electrode that faced the positive electrode current collector-exposed portion at the outermost part of the electrode group was provided with a negative electrode current collector-exposed portion having a length corresponding to about one turn of the electrode group. A lead made of nickel was welded to the end of the negative electrode current collector-exposed portion. The thus produced negative electrode was named a negative electrode plate A.

(b) Negative Electrode Plate B

A negative electrode plate B was produced in the same manner as the negative electrode plate A, except that a porous film containing an inorganic filler was formed on the entire surface of the negative electrode active material layer of the negative electrode plate A in the same manner as in Document 2.

More specifically, the porous film was produced as follows. 970 g of alumina (inorganic filler) having a median diameter of 0.3 μm, 375 g of an NMP solution (BM-720H manufactured by ZEON Corporation) containing 8 wt % of modified polyacrylonitrile rubber as a binder and a proper amount of NMP were stirred using a double arm kneader to prepare a raw material paste. This raw material paste was applied onto the surface of the negative electrode active material layer, and dried under vacuum with a temperature of 120° C. for 10 hours to form a porous film having a thickness of 0.5 μm. The porosity of the porous film was 48%. The porosity was determined by calculation from the thickness of the porous film that was determined by cross-sectional SEM observation, and the amount of alumina present in a certain area of the porous film that was determined by fluorescent X-ray spectroscopy, the true specific gravities of alumina and the binder and the weight ratio of alumina and the binder.

(iii) Assembly of Battery

The positive electrode and the negative electrode plate A were wound, with a polyethylene porous resin film (Hipore (trade name) manufactured by Asahi Kasei Corporation) having a thickness of 20 μm disposed between the electrodes, thereby producing an electrode group. The obtained electrode group was housed inside an outer jacket. A cylindrical case made of nickel-plated iron having a diameter of 18 mm, a height of 65 mm, an internal diameter of 17.85 mm and a thickness of 0.2 mm was used as the outer jacket.

Next, 5.0 g of a non-aqueous electrolyte was injected into the outer jacket. The non-aqueous electrolyte was prepared by dissolving $LiPF_6$ at a concentration of 1 mol/L in a mixed solvent of ethylene carbonate (EC), dimethyl carbonate (DMC) and ethylmethyl carbonate (EMC). The volume ratio of EC, DMC and EMC in the mixed solvent was 1:1:1. Vinylene carbonate was added to the non-aqueous electrolyte such that the concentration of vinylene carbonate was 3 wt %.

Finally, the opening of the outer jacket was sealed with a lid member, thereby completing a lithium secondary battery A having a capacity of 2400 mAh.

A battery B was fabricated in the same manner as the battery A, except that the negative electrode plate B was used.

(iv) Evaluation

First, the battery A and the battery B were subjected to break-in charge/discharge twice. Subsequently, the batteries were subjected to charge with a current of 400 mA until the battery voltage reached 4.1 V, and the charged batteries were stored for seven days under an environment with 45° C.

Next, the stored batteries A and B were discharged, and subsequently charged under the following conditions.

Constant current charge: current value 1500 mA/end-of-charge voltage 4.25 V

Constant voltage charge: charge voltage 4.25 V/end-of-charge current 100 mA

The charged batteries A and B were evaluated as follows.

Example 1

In the present example, the battery A was evaluated.
(i) Processing of Battery (Electrode Group)

First, the electrode group was processed to a predetermined position thereof using a processing member. An iron cutter (the maximum thickness: 0.5 mm) that had been processed to have a sharp tip was used as the processing member. During the processing, vibrations of 20 kHz were applied to the processing member.

By the processing using the processing member, a V-shaped notch having a predetermined length was formed in the electrode group in a depth of 2 mm from the surface of the outer jacket toward the center of the electrode group. More specifically, two cuts were made in the electrode group at different angles, thereby forming a notch having a V-shaped cross section in a direction perpendicular to the longitudinal direction of the notch. The notch was disposed such that the longitudinal direction of the notch was perpendicular to the winding axis of the electrode group.

During the processing of the battery, it is necessary to prevent occurrence of a continuous short circuit. Therefore, the presence or absence of a short circuit at the time of processing was evaluated. More specifically, the battery voltage was measured for about 5 seconds immediately after the processing, and the difference between the battery voltage before the processing and the measured battery voltage (the range of drop in the battery voltage after the processing) was calculated. The results are shown in Table 1.

In the present example, an internal short circuit was considered to have occurred in the battery if the battery voltage dropped to 4.1 V or lower. This also applies to the following examples.

(ii) Internal Short Circuit Test

Next, an internal short circuit was caused in the processed electrode group. More specifically, the pressurizing member was inserted into the above-described notch under an environment with 60° C., and portions of the positive electrode plate and the negative electrode plate that were located inside from the above-described predetermined position were pressurized. While performing the pressurization using the pressurizing member, the battery voltage was measured with the battery information measurement portion. This measurement was carried out at a period (sampling rate) of not more than 5 ms, and an internal short circuit was considered to have occurred in the battery if the battery voltage dropped to 4.1 V or lower even once. The pressurization using the pressurizing member was stopped at the time when an internal short circuit was considered to have occurred.

During the pressurization, it is necessary to cause a short circuit only at a given point at which a short circuit needs to be caused. Therefore, whether or not a short circuit has occurred at portions other than the above-described predetermined position was evaluated. More specifically, the battery voltage was measured for about 5 seconds immediately after occurrence of the short circuit, and the difference between the measured battery voltage and the battery voltage before the pressurization was calculated, thereby determining the range of drop in the battery voltage (the range of drop in the battery voltage after the pressurization). The results are shown in Table 2.

Figure 2:
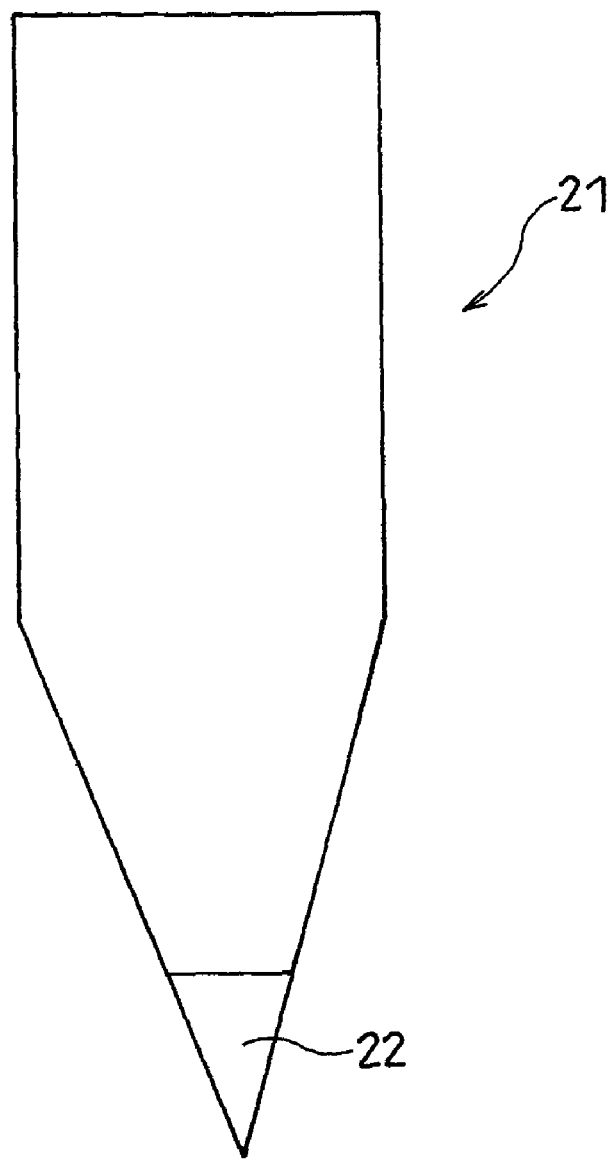
FIG. 2 is a diagram schematically showing the tip of the pressurizing member used in the examples.

Here, no vibration was applied to the pressurizing member during the pressurization of the electrode group. For the pressurization, a wedge-shaped pressurizing member, as shown in FIG. 2, whose tip portion had been subjected to facing process was used. The pressurizing member 21 shown in FIG. 2 includes, at its tip, a portion 22 that had been subjected to facing process. The thickness of the portion 22 was smaller than the width of the notch parallel to the winding axis of the electrode group. This pressurizing member was inserted into the notch such that the thickness direction of the processing member was perpendicular to the longitudinal direction of the notch, and the electrode portions located inside from the notch was pressurized. The processing member 21 was produced by cutting the tip of the cutter used as the processing member at the time of processing the battery using a sandpaper, thereby forming a surface having a maximum width of 0.2 mm at the tip portion.

Example 2

Evaluation was performed in the same manner as in Example 1, except that the electrode group was taken out of the charged battery A under a dry environment, and that only this electrode group was used. The results are shown in Tables 1 and 2.

Example 3

A 5 mm square piece was cut out from the positive electrode plate, the negative electrode plate and the separator to a depth of 2 mm from the surface of the electrode group, and the cut portions of the positive electrode plate, negative electrode plate and separator were removed from the electrode group. Thereafter, an iron nail whose tip portion had been subjected to facing process was pierced into the portions of the electrode plates that had been exposed by removing a portion of the electrode group. Except for the above, evaluation was performed in the same manner as in Example 2. The results are shown in Tables 1 and 2.

The facing of the tip portion was performed by cutting the tip of the nail whose tip portion had been sharpened using a sandpaper, thereby forming a surface having a maximum width of 0.2 mm at the tip portion, as in Example 1.

Example 4

A 5 mm square piece was cut out from the positive electrode plate, the negative electrode plate and the separator to a depth of 2 mm from the surface of the electrode group, thereby insulating a portion of the electrode group from the electrode group. Without removing the cut portions of the positive electrode plate, the negative electrode plate and the separator, the processing member was pierced into the electrode group from the surface of the above-described insulated portion to a predetermined position of the electrode group, and portions of the positive electrode plate and the negative electrode plate that were located inside from the predetermined position were pressurized. Except for the above, evaluation was performed in the same manner as in Example 3. The results are shown in Tables 1 and 2.

Example 5

Evaluation was performed in the same manner as in Example 2, except that the depth of the notch was 4 mm. The results are shown in Tables 1 and 2.

Example 6

Evaluation was performed in the same manner as in Example 2, except that the depth of the notch was 6 mm. The results are shown in Tables 1 and 2.

Example 7

Evaluation was performed in the same manner as in Example 2, except that a ceramic (zirconia) cutter was used as the processing member. The results are shown in Tables 1 and 2.

Example 8

An iron nail whose tip had been sharpened was used as the processing member. While applying vibrations to the processing member, the processing member was driven through the positive electrode plate, the negative electrode plate and the separator to a depth of 2 mm from the surface of the electrode group, thereby forming a through hole. Thereafter, the pressurizing member used in Example 3 was pierced into the through hole, without vibrating and rotating the pressurizing member, and the electrode portions located at the bottom of the through hole were pressurized. Except for the above, evaluation was performed in the same manner as in Example 1. The results are shown in Tables 1 and 2.

Example 9

The processing member used in Example 3 was used as the processing member. This processing member was also used as the pressurizing member. Except for the above, evaluation was performed in the same manner as in Example 8. The results are shown in Tables 1 and 2.

Example 10

Evaluation was performed in the same manner as in Example 8, except that a ceramic (zirconia) nail was used as the pressurizing member. The results are shown in Tables 1 and 2.

Example 11

Evaluation was performed in the same manner as in Example 8, except that a ceramic-coated iron nail was used as the processing member. The results are shown in Tables 1 and 2. As the ceramic, a diamond-like carbon (DLC) was used.

Example 12

A 3 mm diameter columnar grindstone made of tool steel on which diamond fine particles were carried was used as the processing member. This processing member was rotated at 3000 rpm, and the positive electrode plate, the negative electrode plate and the separator were drilled out to a depth of 2 mm from the surface of the electrode group using the processing member, thereby forming a drilled hole (through hole). Thereafter, using the processing member as the pressurizing member, the electrode portions located at the bottom of the through hole were pressured. At this time, the pressurizing member was not rotated. Except for the above, evaluation was performed in the same manner as in Example 1. The results are shown in Tables 1 and 2.

Example 13

Evaluation was performed in the same manner as in Example 12, except that vibrations of 20 kHz were further applied to the processing member. The results are shown in Tables 1 and 2.

Example 14

An end mill made of tool steel and having a maximum diameter of 3 mm was used as the processing member. This processing member was rotated at 3000 rpm and vibrated at 20 kHz, and the positive electrode plate, the negative electrode plate and the separator were drilled out to a depth of 2 mm from the surface of the electrode group using the processing member, thereby forming a drilled hole (through hole). Thereafter, using the processing member as the pressurizing member, the electrode portions located at the bottom of the through hole were pressurized using the pressurizing member. At this time, the pressurizing member was not vibrated and rotated. Except for the above, evaluation was performed in the same manner as in Example 1. The results are shown in Tables 1 and 2.

Example 15

A hole saw made of tool steel and having a maximum diameter of 3 mm was used as the processing member. This processing member was rotated at 3000 rpm and vibrated at 20 kHz, and the positive electrode plate, the negative electrode plate and the separator were drilled out to a depth of 2 mm from the surface of the electrode group using the processing member, thereby forming a drilled hole (through hole). Thereafter, using the processing member as the pressurizing member, the electrode portions located at the bottom of the through hole were pressurized using the pressurizing member. At this time, the pressurizing member was not vibrated and rotated. Except for the above, evaluation was performed in the same manner as in Example 1. The results are shown in Tables 1 and 2.

Example 16

Evaluation was performed in the same manner as in Example 2, except that no vibration was applied to the processing member. The results are shown in Tables 1 and 2.

Example 17

Evaluation was performed in the same manner as in Example 8, except that no vibration was applied to the processing member. The results are shown in Tables 1 and 2.

Example 18

Evaluation was performed in the same manner as in Example 7, except that no vibration was applied to the processing member. The results are shown in Tables 1 and 2.

Comparative Example 1

A short circuit test was performed in the same manner as in Document 1, using the charged battery A without processing the battery A. More specifically, under an environment with 60° C., an iron having a diameter of 3 mm was pierced at a speed of 5 mm/sec from the side of the charged battery A to a depth of 2 mm from the surface of the outer jacket, thereby causing a short circuit.

In the above-described short circuit test, the range of drop in the battery voltage after short-circuiting (the range of drop in the battery voltage after the processing) was measured. The results are shown in Table 2. Additionally, as a result of observation of the tip of the nail used for this test, a plane having a thickness of not less than 0.2 mm was present as in the case of the nail that had been subjected to facing process.

Comparative Example 2

Evaluation was performed in the same manner as in Comparative Example 1, except that the electrode group was taken out of the charged battery A and that only this electrode group was used. The results are shown in Table 2.

Table 1 also shows the shape and material of the processing member, the presence or absence of vibrations and rotations and the processing depth and shape in Examples 1 to 18 and Comparative Examples 1 and 2. Table 2 also shows the shape and material of the pressurizing member in Examples 1 to 18 and Comparative Examples 1 and 2.

TABLE 1

| | Processing target | Processing member | | | | Processing Depth | Shape | Range of drop in battery voltage after processing |
|---|---|---|---|---|---|---|---|---|
| | | Shape | Material | Vibration | Rotation | | | |
| Ex. 1 | A | C | Fe | ON | OFF | 2 mm | J | 0.004 V |
| Ex. 2 | B | C | Fe | ON | OFF | 2 mm | J | 0.002 V |
| Ex. 3 | B | C | Fe | ON | OFF | 2 mm | K | 0.004 V |
| Ex. 4 | B | C | Fe | ON | OFF | 2 mm | L | 0.003 V |
| Ex. 5 | B | C | Fe | ON | OFF | 2 mm | J | 0.008 V |
| Ex. 6 | B | C | Fe | ON | OFF | 2 mm | J | 0.011 V |
| Ex. 7 | B | C | Ce | ON | OFF | 2 mm | J | 0.001 V |
| Ex. 8 | B | D | Fe | ON | OFF | 2 mm | M | 0.002 V |
| Ex. 9 | B | E | Fe | ON | OFF | 2 mm | M | 0.004 V |
| Ex. 10 | B | D | Fe | ON | OFF | 2 mm | M | 0.002 V |
| Ex. 11 | B | D | Fe | ON | OFF | 2 mm | M | 0.002 V |
| Ex. 12 | B | F | DT | OFF | ON | 2 mm | N | 0.005 V |
| Ex. 13 | B | F | DT | ON | ON | 2 mm | N | 0.003 V |
| Ex. 14 | B | G | TS | ON | ON | 2 mm | N | 0.003 V |
| Ex. 15 | B | H | TS | ON | ON | 2 mm | N | 0.003 V |
| Ex. 16 | B | C | Fe | OFF | OFF | 2 mm | J | 0.005 V |
| Ex. 17 | B | D | Fe | OFF | OFF | 2 mm | M | 0.005 V |
| Ex. 18 | B | C | Ce | OFF | OFF | 2 mm | J | 0.001 V |
| Com. Ex. 1 | A | — | — | — | — | — | — | — |
| Com Ex. 2 | B | — | — | — | — | — | — | — |

A: outer jacket and electrode group, B: electrode group only
C: cutter, D: sharpened nail, E: nail subjected to facing process, F: grindstone
G: end mil, H: hole saw
Fe: iron, Ce: ceramic, DT: tool steel (SKH) carrying diamond fine powder
TS: tool steel (SKH)
J: notch, K: 5 mm square-cut and removed, L: 5 mm square-cut only
M: pierced hole
N: drilled hole

TABLE 2

| | Pressurizing member | | Range of drop in battery voltage after pressurization |
|---|---|---|---|
| | Shape | Material | |
| Ex. 1 | O | Fe | 2.1 V |
| Ex. 2 | O | Fe | 2.1 V |
| Ex. 3 | E | Fe | 2.1 V |
| Ex. 4 | E | Fe | 2.1 V |
| Ex. 5 | O | Fe | 2.1 V |
| Ex. 6 | O | Fe | 2.1 V |
| Ex. 7 | O | Fe | 2.1 V |
| Ex. 8 | E | Fe | 2.1 V |
| Ex. 9 | the same as processing member | | 2.1 V |
| Ex. 10 | E | Ce | 2.0 V |
| Ex. 11 | E | P | 2.0 V |
| Ex. 12 | the same as processing member | | 2.1 V |
| Ex. 13 | the same as processing member | | 2.1 V |
| Ex. 14 | the same as processing member | | 2.1 V |
| Ex. 15 | the same as processing member | | 2.1 V |
| Ex. 16 | O | Fe | 2.1 V |
| Ex. 17 | E | Fe | 2.1 V |
| Ex. 18 | O | Fe | 2.1 V |
| Com. Ex. 1 | E | Fe | not less than 2.7 V |
| Com Ex. 2 | E | Fe | not less than 2.7 V |

O: cutter subjected to facing process
P: ceramic-coated iron nail

In Example 1, the electrode group housed in the outer jacket was processed, whereas the electrode group that had been taken out of the outer jacket was processed in Example 2. As shown in Table 1, almost no drop in the battery voltage after the processing was observed in each of these examples. However, the range of drop in the battery voltage in Example 1 was slightly greater than that in Example 2. Therefore, it is preferable that the processing of the electrode group to the predetermined position is performed after taking the electrode group out of the outer jacket.

From the comparison between Example 2 and Example 16, the comparison between Example 8 and Example 17, and the comparison between Example 7 and Example 18, it can be seen that the drop in the battery voltage was slightly suppressed by applying vibrations to the processing member. Therefore, it is preferable to apply vibrations to the processing member during the processing.

From the results of Examples 3 to 6, it can be seen that the range of drop in the battery voltage increased with an increase in the cutting length during the processing. However, no continuous short circuit occurred in each of these examples. Therefore, it can be seen that, with the present invention, it is possible to perform an internal short circuit test at any given position of the electrode group.

In Example 7, in which an insulating processing member made of ceramic was used, the voltage drop was favorably suppressed.

From the results of Example 9, it can be seen that the electrode group can also be processed by applying vibrations to the processing member in the case of using a blunt nail as the processing member. Furthermore, the blunt nail can be used as the pressurizing member by stopping the vibrations. In this case, the processing member can also be used as the pressurizing member, so that it is possible to simplify the evaluation procedure.

In Examples 10 and 11, in which an insulated pressurizing member was used, it can be seen that the drop in the battery voltage at the time of occurrence of the internal short circuit was favorably suppressed. From this result, it seems that there was a current passing through the pressurizing member. Therefore, in the case of eliminating the influence of the conductivity of the pressurizing member, it is preferable to insulate the pressurizing member.

From the results of Examples 12 to 15, it was confirmed that a continuous short circuit could be inhibited by applying rotations to the processing member. Furthermore, from the results of Examples 13 to 15, it was confirmed that the drop in the battery voltage during the processing could be suppressed by rotating and vibrating the processing member. Therefore, applying rotations and vibrations to the processing member is preferable since this can provide the effect of inhibiting a continuous short circuit.

From the results of Examples 16 to 18, it was confirmed that the processing could be performed without applying vibrations and rotations to the processing member in the case where the processing member was sharp.

In each of Examples 1 to 18, the range of drop in the battery voltage was 2.0 to 2.1 V, which was different from the range of drop (2.7 V) in the battery voltage in the case where the portion of the positive electrode current collector and the portion of the negative electrode current collector that were located at the outermost part of the electrode group were short-circuited. From this, it seems that the change in the battery information (i.e., the drop in the battery voltage) that was measured in the evaluation method of the present invention is caused by a short circuit between the positive electrode active material layer and the negative electrode active material layer. Therefore, the results of Examples 1 to 18 indicate that, with the evaluation method of the present invention, it is possible to cause an internal short circuit at a desired position of the electrode group.

On the other hand, the conventional nail penetration test was performed in Comparative Examples 1 and 2. As a result, the range of drop in the battery voltage was not less than 2.7 V. From this result, it can be confirmed that the short circuit resistance was decreased in Comparative Examples 1 and 2 since a short circuit occurred not only at a desired position inside the electrode group, but also at a portion other than the desired position, that is, between the positive electrode current collector-exposed portion and the negative electrode current collector-exposed portion located outside from the desired position on the outer part side of the electrode group.

<Determination of Safety Level>

Evaluation was performed in the same manner as in Example 2, except that the electrode group was taken out of the charged battery B and that only this electrode group was used. As a result, the range of drop in the battery voltage after the pressurization was 0.05 V.

In the battery B, a porous film having heat resistance and insulation was formed on the surface of the negative electrode active material layer. Even if an internal short circuit occurs in the battery, the short circuit point is eliminated immediately owing to the presence of such a porous film, whereby the insulation between the positive electrode and the negative electrode is restored. Accordingly, almost no Joule heat caused by a short circuit current is generated at the short circuit point. That is, the safety level of the battery B was significantly improved.

Accordingly, the safety level of a battery or a battery pack can be specified, for example, by providing the following indication on the battery, the battery pack or a catalog describing the characteristics of the battery.

Battery A "Internal short circuit 60° C./2.1 V"

Battery B "Internal short circuit 60° C./0.05 V"

The method for specifying the safety level is not limited to the above-described representation, and it is possible to use various methods. For example, besides using the numbers showing the test conditions and results as described above, it is possible to specify the safety level using symbols, characters and the like in compliance with a prescribed standard.

As described above, with the use of the evaluation method and evaluation apparatus for batteries according to the present invention, it is possible to accurately evaluate the safety of batteries against an internal short circuit. Therefore, the present invention can provide highly reliable batteries, and is effective in informing the market of the safety level of batteries.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An internal short circuit evaluation method for a battery, the battery comprising an electrode group which is a stacked body including a positive electrode plate, a negative electrode plate wound with a separator interposed between said positive electrode plate and said negative electrode plate, said method comprising steps of:
   (I) preparing said electrode group to be in a charged state;
   (II) performing cutting or abrasion on a part of said electrode group while suppressing a short circuit, starting from an outer surface of said electrode group until a predetermined region in said electrode group becomes exposed;
   (III) pushing or piercing into said predetermined region a pressurizing member with a sharp tip, to cause a short circuit between a portion of said positive electrode plate and a portion of said negative electrode plate which are positioned more inward than said predetermined region;
   (IV) measuring battery information that changed before and after said short circuit; and
   (V) detecting a change of said measured battery information, and determining occurrence of an internal short circuit by comparing said measured battery information with a predetermined reference value.

2. The internal short circuit evaluation method in accordance with wherein, in said step (II), said cutting or abrasion is performed without causing a continuous short circuit.

3. The internal short circuit evaluation method in accordance with claim 1,
   wherein said step (II) comprises a step of forming a notch from said outer surface, so that said predetermined region becomes exposed.

4. The internal short circuit evaluation method in accordance with claim 1,
wherein said step (II) comprises a step of removing a portion of said electrode group from said outer surface so that said predetermined region becomes exposed.

5. The internal short circuit evaluation method in accordance with claim 1,
wherein said step (II) comprises a step of forming, in said electrode group, a through hole from said outer surface until reaching said predetermined region.

6. The internal short circuit evaluation method in accordance with claim 1, wherein:
said battery further comprises a battery case, said battery case housing said electrode group, and
said step (II) is performed after said electrode group is taken out of said battery case.

7. The internal short circuit evaluation method in accordance with claim 1,
wherein, in said step (II), said cutting or abrasion is performed using a processing member, and said processing member is vibrated.

8. The internal short circuit evaluation method in accordance with claim 1,
wherein, in said step (II), said cutting or abrasion is performed using a processing member, and said processing member is rotated.

9. The internal short circuit evaluation method in accordance with claim 1,
wherein, in said step (II), said cutting or abrasion is performed using a processing member, and said processing member has a tip portion having a shape of a sharp projection, a shape of a sharp blade edge, or a grindstone-like surface.

10. The internal short circuit evaluation method in accordance with claim 1, wherein:
said battery further comprises a battery case, said battery case housing said electrode group, and
said step (II) is a step of performing cutting or abrasion on a part of said battery case and said electrode group, starting from an outer surface of said battery case toward said predetermined region in said electrode group, until said predetermined region becomes exposed.

11. An internal short circuit evaluation apparatus for a battery, the battery comprising an electrode group which is a stacked body including a positive electrode plate, a negative electrode plate wound with a separator interposed between said positive electrode plate and said negative electrode plate, said apparatus comprising:
(1) a processing portion comprising a processing member for performing cutting or abrasion on a part of said electrode group, starting from an outer surface of said electrode group until a predetermined region in said electrode group becomes exposed;
(2) a pressurizing portion comprising a pressurizing member with a sharp tip which is pushed or pierced into said predetermined region that is exposed, to cause a short circuit between a portion of said positive electrode plate and a portion of said negative electrode plate which are positioned more inward than said predetermined region;
(3) a battery information measurement portion for measuring battery information that changes before and after said short circuit;
(4) a short circuit detection portion for detecting a change of said battery information that is measured by said battery information measurement portion, and determining occurrence of an internal short circuit by comparing said battery information with a predetermined reference value; and
(5) a pressurization control portion for controlling said pressurizing portion according to a signal from said short circuit detection portion.

12. The internal short circuit evaluation apparatus in accordance with claim 11,
wherein said processing member and said pressurizing member are the same.

13. The internal short circuit evaluation apparatus in accordance with claim 11, further comprising
a vibration generation portion for vibrating said processing member.

14. The internal short circuit evaluation apparatus in accordance with claim 11, further comprising
a rotation mechanism for rotating said processing member.

15. The internal short circuit evaluation apparatus in accordance with claim 11,
wherein said processing member has a tip portion having a shape of a sharp projection, a shape of a sharp blade edge, or a grindstone-like surface.

16. The internal short circuit evaluation apparatus in accordance with claim 11,
wherein said pressurizing member has a tip portion having a shape of a sharp projection or a shape of a sharp blade edge.

17. The internal short circuit evaluation apparatus in accordance with claim 11, wherein:
said battery further comprises a battery case, said battery case housing said electrode group, and
said processing portion (1) comprises said processing member for performing cutting or abrasion on a part of said battery case and said electrode group, starting from an outer surface of said battery case toward said predetermined region in said electrode group, until said predetermined region becomes exposed.

* * * * *